May 14, 1968

R. A. J. FAGEL 3,382,958

SPROCKET WHEEL FOR CRAWLER TYPE VEHICLE HAVING
INCORPORATED SPEED-REDUCING
GEARS AND BRAKES

Filed June 20, 1966

INVENTOR
ROGER A.J. FAGEL

BY

ATTORNEY

United States Patent Office 3,382,958
Patented May 14, 1968

3,382,958
SPROCKET WHEEL FOR CRAWLER TYPE VEHICLE HAVING INCORPORATED SPEED-REDUCING GEARS AND BRAKES
Roger A. J. Fagel, Marcinelle, Belgium, assignor to Ateliers de Constructions Electriques de Charleroi (ACEC), Charleroi, Belgium
Filed June 20, 1966, Ser. No. 558,855
Claims priority, application Belgium, June 23, 1965, 665,796
2 Claims. (Cl. 192—4)

ABSTRACT OF THE DISCLOSURE

A sprocket-wheel for crawler type vehicle, equipped with a speed reduction gear system located inside a spindle, comprising roller-bearings on which rotates the sprocket-wheel, characterized in that the sprocket-wheel has a hub possessing a cylindrical part perforated by two circumferential series of radial openings, externally emerging in an annular chamber forming one piece with the hub, having a wall whose external flat surface which is perpendicular to the axis of rotation of the sprocket-wheel forms a disc-brake, the said two series of openings communicating on one hand with the internal surface of the cylindrical part surrounding the spindle, the external surface of the said cylindrical part being surrounded by an annular bead forming a baffle, separating the two series of openings, and delimiting two enclosures for the passage of lubrication oil respectively of the speed reduction gear system and the roller-bearings, means for circulating said oil from one enclosure to the other while passing successively through the two series of the openings so that the said oil is used as a cooling fluid for the wall of the annular chamber forming a disc-brake, the said oil being circulating in a closed circuit through external means.

---

The present invention is directed to sprocket-wheels for crawler type vehicles having incorporated speed-reduction gears and brakes.

The present invention is more particularly directed to caterpillar vehicles wherein the direction is controlled by the braking of one of the two sprocket-wheels.

A driving system of the type described, whether it is manual or automatic, leads to the heating of the brakes due to the continuous and inevitable corrections. The elimination of the dissipated calories presents an important problem.

An object of the present invention consists in an efficient solution for the elimination of the calories in the device described.

A particular object of the present invention is directed to the elimination of calories in caterpillar vehicles when the sprocket-wheels are actuated by independent electrical motors.

According to the invention, there is provided a sprocket-wheel for a crawler type vehicle, comprising a speed-reduction gear system, a sprocket wheel hub surrounding said spindle and connected to said sprocket-wheel, and roller bearings mounted between said sprocket-wheel hub and said spindle, said hub being mounted on an end flange in cantilever fashion, said end flange forming a radial space between said spindle and said end flange, said hub including an integrally connected annular chamber, wherein said chamber has a first and second wall, said first wall being plane and perpendicular to the axis of rotation of the sprocket-wheel and forming a friction surface for a disc-brake, said second wall being cylindrical in shape and radially spaced from said spindle, a first and second circumferential series of radial openings perforate the second wall and emerge into the chamber, said first series being spaced axially adjacent said end flange, an annular bead surrounding the spindle and spaced axially between the two circumferential of radial openings, said bead forming a first and second cylindrical space between the spindle and said second wall, said first cylindrical space being integral with said radial space, a passage being thus formed which includes the interior of said spindle, said radial space, said first cylindrical space, said first series of openings, the space within said annular chamber, said second series of openings, and said second cylindrical space, means for circulating oil through said passage for lubricating said gearing and bearings and cooling said second wall.

Figure 1:
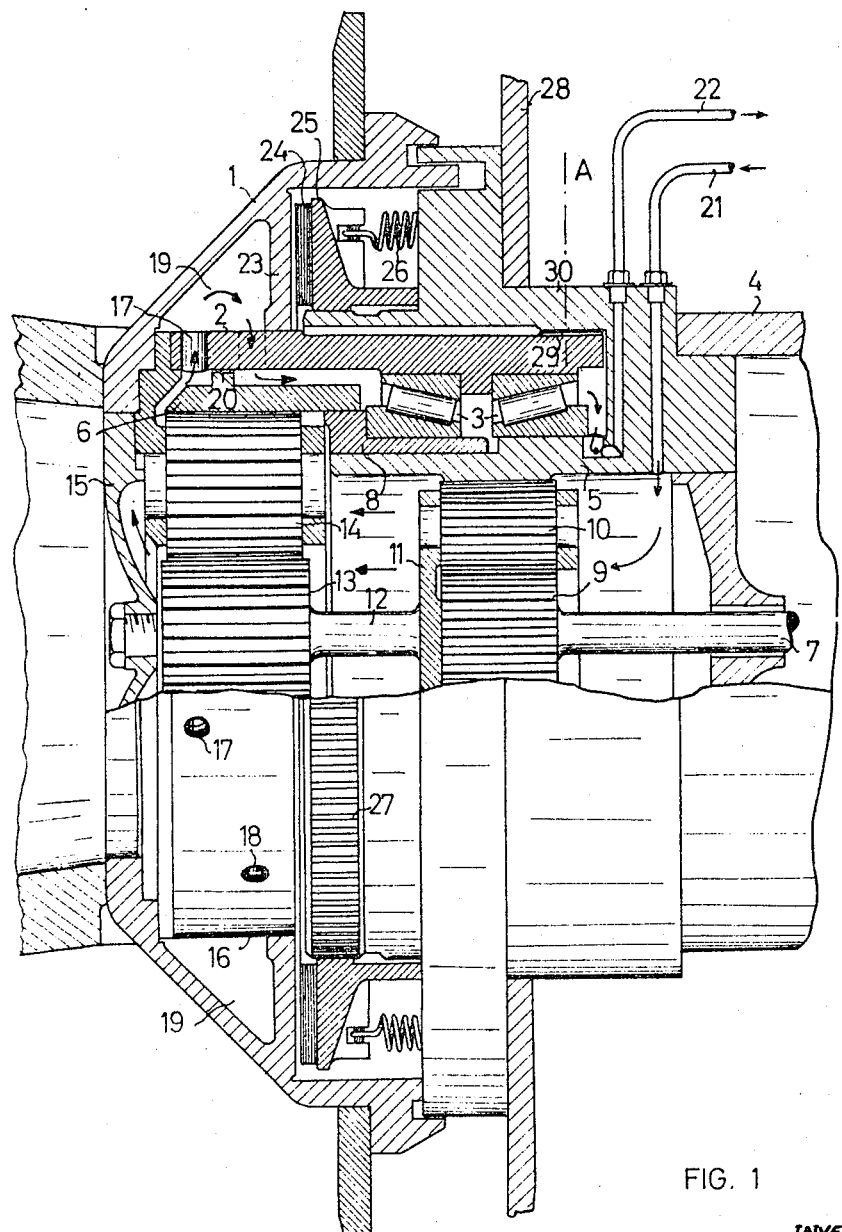
Figure 2:
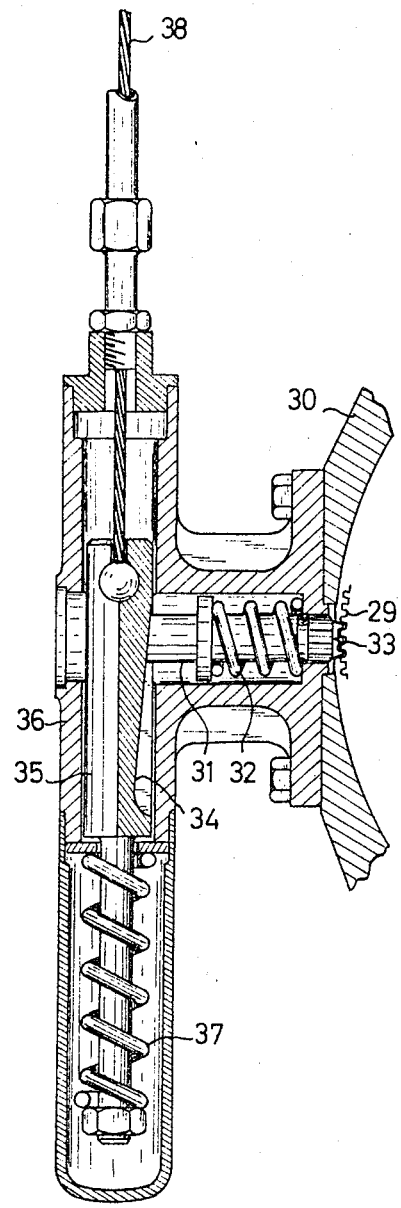

The following description and the annexed drawings are directed to a particular embodiment of the present invention wherein:

FIGURE 1 shows a partial sectional view of the sprocket-wheel directed to drive a caterpillar vehicle (not shown), FIGURE 2 shows a partial sectional view along plane A of FIGURE 1 which constitutes the parking brakes mechanism.

The sprocket-wheel comprises a movable part 1 solidly fixed to a hub 2 rotating on roller-bearings 3 supported by a spindle 6 to the shell 4 of an electric motor (not shown). This spindle is constituted by the rims 5 and 6, internally toothed, by two planet-gear systems constituting a speed reduction gear device driven by the shaft 7 of the motor and driving the movable part 1 of the sprocket-wheel. The rims 5 and 6 are solidly fixed by an intermediate sleeve 8 fluted internally and externally, engaging in the corresponding flutes on the internal surface of the rim 6 and on the external surface of the rim 5.

The sleeve 8 is immobilized by a threaded ring (not shown) whose tightening takes up the play of the roller-bearings 3. The shaft 7 carries, at its extremity, a pinion 9 engaging with the planet-gears 10 and engaging on the other hand with the internal teeth of the fixed rim 5. The axes of the pinions 10 are fixed to a gear-carrying box 11 solidly fixed to a loose shaft 12 whose other extremity carries the central pinion 13 of the second planet-gears system whose planet-gears 14 are engaged with the internal teeth of the fixed rim 6. The axes of the planet-gears 14 are supported by a plate 15 fixed to the movable part 1 and constituting a cover for the speed-reduction gear system.

The hub 2 has a cylindrical part 16 bored by radial openings, arranged in quincunx, in two circumferential and parallel series 17 and 18 emerging on one hand in the annular chamber 19 of the movable part 1 and on the other hand, inside the hub 2, in line with the external surface of the fixed rim 6 which is surrounded by an annular bead 20 forming a baffle and located between the two series of openings 17 and 18. This bead divides the internal space of the hub in two enclosures which communicate between each other only by the openings 17 and 18 through the annular chamber 19. The enclosure related to the opening 17 communicates with the speed-reduction gears while the one related to the openings 18 contains the roller-bearings 3.

The lubricating oil is brought, through a pipe 21, inside the gear-reduction system, passes through the latter, and through the opening 17, in the annular chamber 19, and comes out by the opening 18, through the roller-bearings 3 and through the pipe 22 connected to external means not shown wherein the oil is cooled and comes back, in a closed circuit, through the pipe 21 by the action of a pump (not shown) which could, eventually, be incorporated to the gear reduction system. The direction of the oil circulation is indicated in FIGURE 1 by arrows.

The annular chamber 19 possesses a wall 23 whose outer surface is plane and perpendicular to the axis of rotation of the sprocket-wheel, and constitute a braking disc on which a brake lining 24 of a plate 25 is resting, wherein the said lining 24 of the plate 25 constitutes the movable part of the brake. This plate 25, taken up by the springs 26, can axially slide under the action of a hydraulic control (not shown), along threads in the boring of the said control, the said threads being engaged in the corresponding thread 27 of a cylindrical piece solidly fixed to the frame of the sprocket-wheel which is fixed on the casing 28 of the vehicle.

The calories dissipated by the friction of the lining 24 on the braking surface are transmitted by conductibility, through the wall 23, to the oil of the chamber 19 and evacuated by the circulation of the latter.

The hub 2 carries, at its periphery, a series of threads 29 directed to cooperate with parking brakes mechanism not shown in FIGURE 1 but shown in FIGURE 2. This mechanism may be fixed to any spot around the periphery of the cylindrical portion 30 of the fixed part of the sprocket-wheel. It comprises a sliding piece 31 biased by a spring 32, whose extremity, passing through an adequate opening located in the wall of the portion 30, has threads 33 directed to engage in the threads 29. The sliding piece 31 is pushed by a cam in the shape of a wedge 34 which is cut into a cylindrical piece 35, movable in a cylinder 36 and biased, by the action of a spring 37. At the extremity of this piece 36 is fixed a cable 38 which by traction and by means of an appropriate control, enables the disengagement of the thread 33 from the thread 29 and consequently, the releasing of the vehicle.

It is understood that various modifications may be made to the above-described embodiment without departing from the invention.

I claim:

1. A sprocket-wheel for a crawler type vehicle, comprising a speed-reduction gear system, a spindle surrounding said speed reduction gear system, a sprocket-wheel hub surrounding said spindle and connected to said sprocket-wheel, and roller-bearings mounted between said sprocket-wheel hub and said spindle, said hub being mounted on an end flange in cantilever fashion, said end flange forming a radial space between said spindle and said end flange, said hub including an integrally connected annular chamber, wherein said chamber has a first and second wall, said first wall being plane and perpendicular to the axis of rotation of the sprocket-wheel and forming a friction surface for a disk brake, said second wall being cylindrical in shape and radially speced from said spindle, a first and second circumferential series of radial openings perforate the second wall and emerge into the chamber, said first series being spaced axially adjacent said end flange, an annular bead surrounding the spindle and spaced axially between the two circumferential series of radial openings, said bead forming a first and second cylindrical space between the spindle and said second wall, said first cylindrical space being integral with said radial space, a passage being thus formed which includes the interior of said spindle, said radial space, said first cylindrical space, said first series of openings, the space within said annular chamber, said second series of openings, and said second cylindrical space, means for circulating oil through said passage for lubricating said gearing and bearings and cooling said second wall.

2. A sprocket-wheel as recited in claim 1, wherein the hub further comprises a cylindrical portion presenting threads on its outer periphery and rotating inside a fixed cylindrical part integral with the casing of the sprocket-wheel and the said cylindrical part having an aperture through which a sliding piece moves axially, the said sliding piece having a threaded end directed to engage the threaded part of the hub, the said sliding piece being actuated by a wedge-shaped cam movable perpendicular to the axis of said sliding piece and adapted to stop the vehicle.

References Cited
UNITED STATES PATENTS

| | | | |
|---|---|---|---|
| 1,203,876 | 11/1916 | Horner | 192—4 |
| 1,849,890 | 3/1932 | Straub | 192—4 |
| 2,866,522 | 12/1958 | Morley et al. | 60—39.08 |
| 2,870,870 | 1/1959 | Haworth et al. | 60—39.08 |

MARTIN P. SCHWADRON, *Primary Examiner.*

CARLTON R. CROYLE, *Examiner.*

C. B. LEEDOM, *Assistant Examiner.*